UNITED STATES PATENT OFFICE.

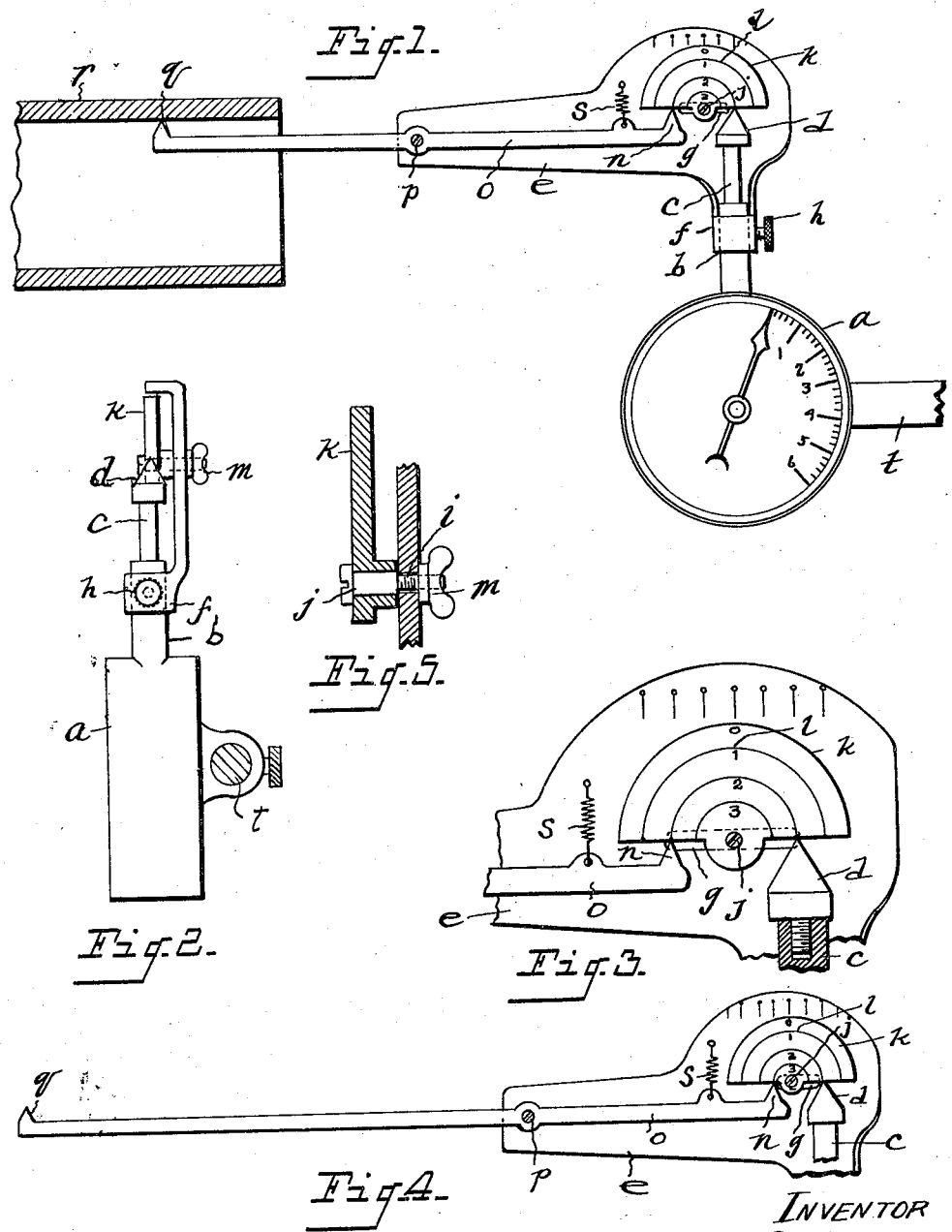

HARRY B. DOUGLASS, OF DETROIT, MICHIGAN.

GAGE.

1,390,432.  Specification of Letters Patent.  Patented Sept. 13, 1921.

Application filed May 24, 1919. Serial No. 299,541.

*To all whom it may concern:*

Be it known that I, HARRY B. DOUGLASS, a citizen of the United States, residing at Detroit, in the county of Wayne and State of Michigan, have invented certain new and useful Improvements in Gages, of which the following is a specification.

This invention relates to an instrument for indication of variations in an internal surface. The instrument is designed to be attached to the conventional forms of indicators which are in common use for indicating variations in measurements of external surfaces. It is very often desirable to ascertain whether the inside surface of a bushing, for instance, has any variations from its intended form or whether the bushing while being revolved preparatory to being worked upon is traveling true. Instruments to accomplish this object are not broadly new, but my invention is a very simple attachment that can be secured to many forms of indicators now on the market and which can be manufactured at a minimum cost and which has a range of adjustability in the way of magnifying or diminishing the indications.

In the drawings,—

Figure 1 is an elevation showing the attachment in connection with the Brown & Sharp indicator.

Fig. 2 is an end view of the attachment and side elevation of the indicator taken from the right of Fig. 1.

Fig. 3 is an enlarged fragment of the attachment showing how it is connected with the indicator stem.

Fig. 4 is a view of a modified form.

Fig. 5 is a sectional detail showing how the motion-reversing segment is adjustably mounted.

$a$ designates a conventional form of indicator for indicating in thousandths. The Brown & Sharp indicator is here shown and is a well known type that can be had on the market. This is provided with a projecting tube $b$ which guides the reciprocating stem $c$, which is usually provided with a little head or knob (not shown) that screws into the end of the stem and which can be brought to bear upon the surface which is to be measured or variations which are to be recorded. The pointer is connected with this stem by a mechanism that need not be described as it is no part of this invention. The movements of the stem $c$ are transmitted in magnified form to the pointer on the dial so that the travel of the pointer on the dial indicates the extent of the movements of the stem $c$. In place of the conventional knob that screws into the end of the stem, I substitute a special head $d$ that tapers to a point at the outer end.

A special form of plate or carrier $e$ having integrally attached thereto a small sleeve $f$ is employed to mount the attachment. The sleeve $f$ fits on to the tube $b$ of the indicator and the set screw $h$ may be used to hold it there in place. In the plate is a slot $g$ through which engages the bolt $i$ whose outer end is formed into a pivot $j$ to mount the motion-reversing segment $k$. By loosening the thumb nut $m$ the pivot may be adjusted along the slot and hence the position of the motion-reversing segment may be altered as regards the plate or carrier $e$. This motion-reversing segment $k$ is grooved with a number of arcs $l$, and the grooves also continue across the face that forms the diameter of the segment. These diameter-surface crossing-grooves are adapted to seat the point of the head $d$ and also the beveled edge of the lever head $n$ that is the terminal of the lever $o$ that is pivoted at $p$ to the outer end of the plate or carrier $e$. As shown in Fig. 1, the distance from the beveled edge of the head $n$ to the other contact point $q$, is just twice the distance from the pivot $p$ to either end. The modification shown in Fig. 4 is the same except here the distance from the beveled edge of the head $n$ to the pivot is only one-half of the distance from the pivot to the contact point $q$. Hence the lever diminishes the movement just one-half the variations noted by the movement of the contact point $q$ in the modification shown in Fig. 4.

When the bushing $r$ is mounted in a chuck the indicator with my new attachment may be moved up and the same adjusted to bring the contact point $q$ in contact with the internal surface of the bushing. The spring in the indicator will keep the contact point $q$ in contact with the surface. The spring $s$ keeps the lever against the segment. The dial $a$ may be turned around in the familiar way to bring the markings thereon so that the zero point is in registry with the pointer when the initial placement of the indicator and attachment is made. The indicator and attachment may be carried on any standard form of bracket, an arm of which is shown fragmentarily at t.

Now obviously when the chuck with the bushing r is revolved, if the interior surface of the bushing varies from a true cylinder or it is misplaced in the chuck so it is running out of true, these conditions will cause movement of the contact point q, which will cause the lever head n to rotate the motion-converting segment the same amount as the movement of the contact point (in the modification shown in Fig. 1), and the motion-reversing segment in turn will move the head of the indicator stem the same distance and this will finally be registered by the pointer on the dial.

The purpose of the movable character of the reversing segment along the slot g is to vary the movement of the lever head n with respect to the indicator stem head d. Thus if the segment is moved to the left in Fig. 1 to bring the groove 3 in contact with the beveled edge of the head n, this will bring the groove 1 in contact with the point of the indicator stem head. In this condition instead of being an equal ratio of movement, the movement of the head n will be multiplied so that it will be a 3 to 1 relation. On the other hand, by adjusting the reversing segment to the right in Fig. 1 and bringing the beveled edge of the lever head n in the groove 1, the point of the indicator stem d will be in the groove 3 and consequently there will be a diminishment of the movement of the indicator stem with respect to the lever o and will be as 1 to 3.

Of course, this instrument is adapted for other work than taking variations for internal surfaces but it is chiefly for this purpose it is designed, and it is, therefore, so called.

What I claim is:

1. An instrument for the purpose specified, having in combination, an indicator provided with an indicator stem, a carrier which can be secured to the indicator, a lever pivoted on the carrier for contacting the work, and a motion converting member fixable at various positions along the carrier and provided with unit markings thereon, the said motion converting member adapted to engage both the stem and lever on the said unit markings to fix a definite multiplying ratio between the lever and the indicator stem.

2. An instrument for the purpose specified, having in combination, an indicator provided with an indicator stem, a carrier which can be secured to the indicator, a lever fulcrumed on the carrier, and a motion converting member fixable at various places along the carrier to change its relation with respect to both the indicator stem and the lever with both of which it engages and thereby change the multiplying ratio of movement communicated to the said indicator stem.

3. An instrument for the purpose specified, having in combination, an indicator provided with a stem, a carrier secured to the indicator, the said stem being provided with a head having a point, a segment provided with grooves and pivoted to the carrier, a contact lever pivoted to the carrier provided with a head having a beveled edge adapted to engage one of the grooves of the segment and having its outer end provided with a contact point, and a spring for causing the contact point to follow the surface to be worked upon.

4. An instrument for the purpose specified, having in combination, an indicator provided with a stem having a head with a point, a carrier secured to the indicator provided with a slot, a motion-reversing segment provided with a plurality of grooves and having a movable pivoting in said slot of the carrier, and a contact lever pivoted to the carrier and having a head with a beveled edge for engaging the grooves of the segment and having its outer end provided with a contact point, and a spring for causing the contact point to follow the work, the said segment being adjustable along the slot of the carrier to vary the grooves that are brought into engagement with the two ends of the two heads to vary the relation of the movements of the lever and indicator stem.

In testimony whereof I affix my signature.

HARRY B. DOUGLASS.